US010419191B2

(12) United States Patent
Dutta et al.

(10) Patent No.: US 10,419,191 B2
(45) Date of Patent: Sep. 17, 2019

(54) SYSTEMS, METHODS, AND COMPUTER-READABLE MEDIA UTILIZING AN IMPROVED RADIO FRAME DESIGN AND MAC LAYER FOR ULTRA-LOW LATENCY

(71) Applicant: New York University, New York, NY (US)

(72) Inventors: Sourjya Dutta, Brooklyn, NY (US); Russell Ford, Brooklyn, NY (US); Sundeep Rangan, Jersey City, NJ (US); Marco Mezzavilla, Brooklyn, NY (US)

(73) Assignee: New York University, New York, NY (US)

( * ) Notice: Subject to any disclaimer, the term of this patent is extended or adjusted under 35 U.S.C. 154(b) by 40 days.

(21) Appl. No.: 15/407,894

(22) Filed: Jan. 17, 2017

(65) Prior Publication Data
US 2017/0208621 A1 Jul. 20, 2017

Related U.S. Application Data

(60) Provisional application No. 62/279,413, filed on Jan. 15, 2016.

(51) Int. Cl.
*H04W 72/12* (2009.01)
*H04B 7/04* (2017.01)
(Continued)

(52) U.S. Cl.
CPC ....... *H04L 5/0055* (2013.01); *H04W 72/1289* (2013.01); *H04L 5/14* (2013.01);
(Continued)

(58) Field of Classification Search
CPC ...... H04W 72/129; H04W 24/02; H04B 7/04; H04L 5/0055
See application file for complete search history.

(56) References Cited

U.S. PATENT DOCUMENTS 8,923,197 B2 12/2014 Pi et al.
2012/0177000 A1* 7/2012 Seo .................. H04L 5/001
370/329
(Continued)

OTHER PUBLICATIONS

Koh, Kwang-Jin et al., "A Millimeter-Wave (40-45 GHz) 16-Element Phased-Array . . . ," IEEE, vol. 44, No. 5, pp. 1498-1509, May 2009.

(Continued)

*Primary Examiner* — Kevin C. Harper
*Assistant Examiner* — Henry Baron
(74) *Attorney, Agent, or Firm* — Hunton Andrews Kurth LLP

(57) ABSTRACT

Exemplary communication apparatus comprising a MAC-layer processor configured to receive data for a downlink transmission to a first device; transmit a grant comprising resource allocations for the device to receive the data and to transmit a reception status for the data; and transmit the first grant and at least part of the data in a symbol. The grant can also be frequency-multiplexed with another grant to another device in the symbol, which can also be spatially multiplexed in streams directed to the respective devices. Other embodiments include determining a resource allocation for a device that encompasses resources previously allocated to at least one other device but comprises an indicator that such resource is unavailable to the device. Exemplary methods and computer-readable media can also be provided embodying one or more procedures the apparatus is configured to perform.

16 Claims, 12 Drawing Sheets

(51) Int. Cl.
*H04L 5/00* (2006.01)
*H04W 24/02* (2009.01)
*H04L 29/08* (2006.01)
*H04L 5/14* (2006.01)
*H04L 27/26* (2006.01)
*H04W 72/04* (2009.01)

(52) U.S. Cl.
CPC ........ *H04L 27/2601* (2013.01); *H04L 69/323* (2013.01); *H04L 69/324* (2013.01); *H04W 72/0446* (2013.01)

(56) References Cited

U.S. PATENT DOCUMENTS

| | | | | |
|---|---|---|---|---|
| 2013/0039291 | A1* | 2/2013 | Blankenship | H04L 5/001 370/329 |
| 2015/0004992 | A1* | 1/2015 | Tanaka | H04B 7/024 455/450 |
| 2015/0092694 | A1* | 4/2015 | You | H04W 4/70 370/329 |

OTHER PUBLICATIONS

Akdeniz, Mustafa Riza et al., "Millimeter Wave Channel Modeling and Cellular . . . ," IEEE, vol. 32, No. 6, pp. 1164-1179, Jun. 2014.
Alkhateeb, Ahmed et al., "Hybrid Precoding for Millimeter Wave Cellular Systems . . . ," Pro. Information Theory and Applications Workshop (ITA), pp. 1-5, Feb. 2013.
Alkhateeb, Ahmed et al., "MIMO Precoding and Combining Solutions for Millimeter-Wave Systems," IEEE Communications Magazine, vol. 52, No. 12, pp. 122-131, Dec. 2014.
Andrews, Jeffrey G. et al., "What Will 5G Be?," IEEE Journal on Selected Areas in Communications, vol. 32, No. 6, pp. 1065-1082, Jun. 2014.
Bai, Tianyang et al., "Coverage and Rate Analysis for Millimeter Wave Celluar Networks," IEEE Trans. Wireless Commun., vol. 14, No. 2, pp. 1100-1114, Feb. 2015.
Barati, C. Nicolas et al., "Directional Cell Discovery in Millimeter Wave Cellular Networks," IEEE Trans. Wireless Commun., vol. 14, No. 12, pp. 6664-6678, Dec. 2015.
Baykas, Tuncer et al., "IEEE 802.15.3c: The First IEEE Wireless . . . ," IEEE Communications Magazine, pp. 114-121, Jul. 2011.
Boccardi, Federico et al., "Five Disruptive Technology Directions for 5G," IEEE Communications Magazine, vol. 52, No. 2, pp. 74-80, Feb. 2014.
Dahlman, Erik et al., "3G Evolution: HSPA and LTE for Mobile Broadband," Oxford UK Academic Press, pp. 1-485, First Edition, 2007.
Daniels, Robert C. et al., "60 GHz Wireless Communications: Emerging Requirements and Design . . . ," IEEE Veh. Technol. Mag., vol. 2, No. 3. pp. 41-50, Sep. 2007.
Daniels, Robert C. et al., "60 GHz Wireless: Up Close and Personal," IEEE Microwave Magazine, vol. 11, No. 7, pp. S44-S50, Dec. 2010 Supplement.
Fettweis, Gerhard et al., "5G: Personal Mobile Internet Beyond . . . ," IEEE Communications Magazine, vol. 52, No. 2, pp. 140-145, Feb. 2014.
Fletcher, Alyson K. et al., "Robust Predictive Quantization: Analysis . . . ," IEEE Journal of Selected Topics in Signal Processings, vol. 1, No. 4, pp. 618-632, Dec. 2007.
Gersho, Allen et al., "Vector Quantization and Signal Compression," Kluwer Academic Publication, pp. C1-737, 1992.
Ghosh, Amitava et al., "Millimeter-Wave Enhanced Local Area Systems: A High-Data-Rate . . . ," IEEE Journal on Selected Areas in Comm., vol. 32, No. 6, pp. 1152-1163, Jun. 2014.
Guan, Xiang et al., "A Fully Integrated 24-GHz Eight-Element Phased-Array . . . ," IEEE Journal of Solid-State Circuits, vol. 39, No. 12, pp. 2311-2320, Dec. 2004.

Hansryd, Jonas et al., "Non-Line-of-Sight Microwave . . . ," Ericsson Review, pp. 1-8, Feb. 22, 2013.
Kela, Petteri et al., "A Novel Radio Frame Structure for 5G Dense Outdoor Radio Access Networks," IEEE, pp. 1-6, May 2015.
Pi, Zhouyue et al., "An Introduction to Millimeter-Wave . . . ," IEEE Communications Magazine, vol. 49, No. 6, pp. 101-107, Jun. 2011.
Khan, Farooq et al., "Millimeter-Wave Mobile Broadband . . . ," Proc. IEEE 50th Ann. Allerton Confer. on Comm. Contr. and Computing, pp. 1517-1523, Oct. 1-5, 2012.
Khan, Farooq et al., "Millimeter-Wave Mobile Broadband: Unleashing 3-300GHz . . . ," Proc. IEEE Sarnoff Symposium, pp. 1-117, Mar. 28, 2011.
Koh, Kwang-Jin et al., "0.13-um CMOS Phase Shifters for X-, Ku-, and K-Band . . . ," IEEE Journal of Solid-State Circuits, vol. 42, No. 11, pp. 2335-2546, Nov. 2007.
Levanen, Toni et .al., "Radio Interface Design for Ultra-Low Latency . . . ," Proc. IEEE Globecom Workshops, pp. 1420-1426, Dec. 2014.
Levanen, Toni et al., "Dense Small-Cell Networks: Rethinking . . . ," Proc. IEEE 1st International Conference on 5G for Ubiquitous Connectvity, pp. 163-169, Nov. 2014.
Levanen, Toni A. et al., "Radio Interface Evolution Towards 5G and Enhanced . . . ," IEEE Access, vol. 2, pp. 1005-1029, 2014.
Lahetkangas, Eeva et al., "Achieving Low Latency and Energy Consumption by . . . ," Proc. IEEE, ICC'14—WB: Workshop on 5G Technologies, pp. 1-6, Jun. 2014.
Rappaport, Theodore S. et al., "Wideband Millimeter-Wave Propagation Measurements and . . . ," IEEE Transactions on Communications, vol. 63, No. 9, pp. 3029-3056, Sep. 2015.
Mogensen, Preben et al., "LTE Capacity Compared to the Shannon Bound," Proc. IEEE 65th Vehi. Tech. Con., pp. 1234-1238, Apr. 2007.
Nokia Siemens Networks White Paper, "LTE-Capable Transport: A Quality User Experience Demands on End-to-End Approach," http://www.nokiasiemensnetwork.com, 2011.
Osseiran, Afif et al., "Scenarios for 5G Mobile and Wireless Communications: . . . ," IEEE Commun. Mag., vol. 52, No. 5, pp. 26-35, May 2014.
Pi, Zhouyue et al., "A Millimeter-Wave Massive MIMO System . . . ," Proc. IEEE 46th, Asilomar Conference on Signals, Systems and Computers, pp. 693-698, Nov. 2012.
Roufarshbaf, Hossein et al., "OFDM-Based Analog Multiband: A Scalable Design for Indoor . . . ," IEEE Globalcom-Signal Procee. for Comm. Symp., pp. 3267-3276, Dec. 2014.
Rajagopal, Sridhar "Power Efficiency: The Next Challenge for Multi-Gigsbit-Per-Second Wi-Fi," IEEE Communications Magazine, pp. 40-45, Nov. 2014.
Rangan, Sundeep et al., "Millimeter Wave Cellular Wireless Networks: . . . ," Proc. IEEE, vol. 102, No. 3, pp. 366-385, Mar. 2014.
Rappaport, Theodore S. et al.,"Millimeter Wave Mobile Communications for 5G Cellular: . . . ," IEEE Access, vol. 1, pp. 335-349, 2013.
Rappaport, Theodore S. et al., "State of the Art in 60-GHz Integrated Circuits . . . ," Proc. IEEE, vol. 99, No. 8, pp. 1390-1436, Aug. 2011.
Samimi, Mathew K. et al., "Probabilistic Omnidirectional Path Loss Models for . . . ," IEEE Wireless Communications Letters, vol. 4, No. 4, pp. 357-360, Aug. 2015.
Shariatmadari, Hamidreza et al., "Machine-Type Communications: Current Status and . . . ," IEEE Communications Magazine, vol. 53, No. 9, pp. 10-17, Sep. 2015.
Shokri-Ghadikolaei, Hossein et al., "Millimeter Wave Cellular Networks: A MAC . . . ," IEEE Transactions on Communications, vol. 63, No. 10, pp. 3437-3458, Oct. 2015.
Sun, Shu et al., "MIMO for Millimeter-Wave Wireless Communications: Beamforming, . . . " IEEE Communications Magazine, vol. 52, No. 12, pp. 110-121, Dec. 2014.
Tse, David et al., "Fundamentals of Wireless Communications," Cambridge University Press, pp. 1-646, Aug. 13, 2004 and 2007.
Zhang, Hong et al., "Analog Multitone with Interference Suppression: . . . " Proc. IEEE Globalcom-Communication Theory Symposium, pp. 2305-2310, 2012.

(56) References Cited

OTHER PUBLICATIONS

3GPP2, "cdma2000 Evaluation Methodology," C.R1002-A, v1.0, May 11, 2009 and Dec. 2010.
3GPP, "Evolved Universal Terrestrial Radio Access (E-UTRA) . . . ," ETSI TS 136.331, v12.7.0, 2015.
3GPP, "Medium Access Control (MAC) Protocol Specification," TS 36.321, v8.0.0, 2007.

\* cited by examiner

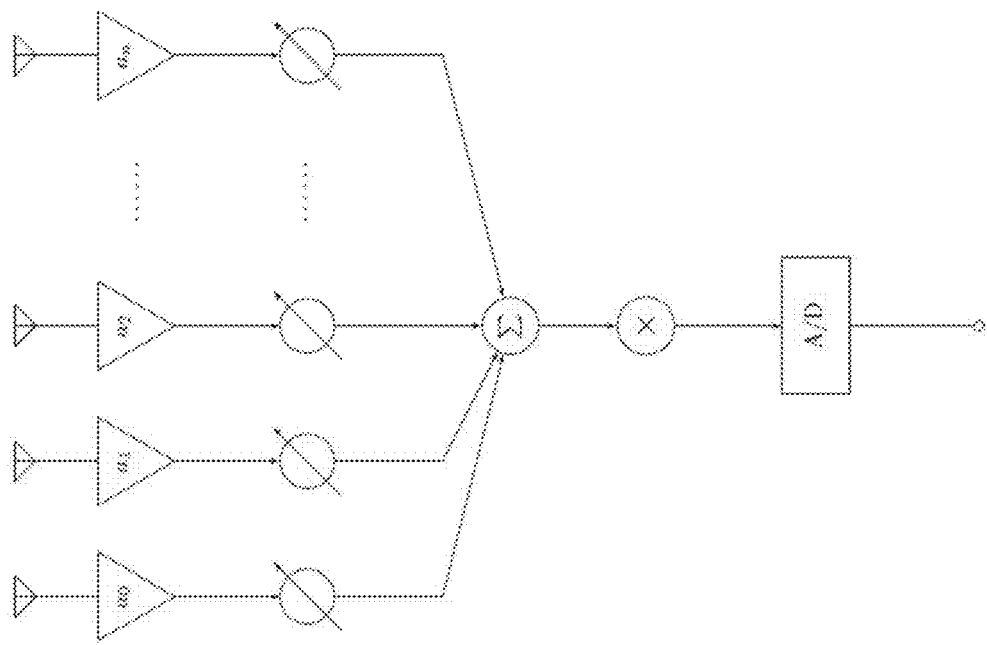
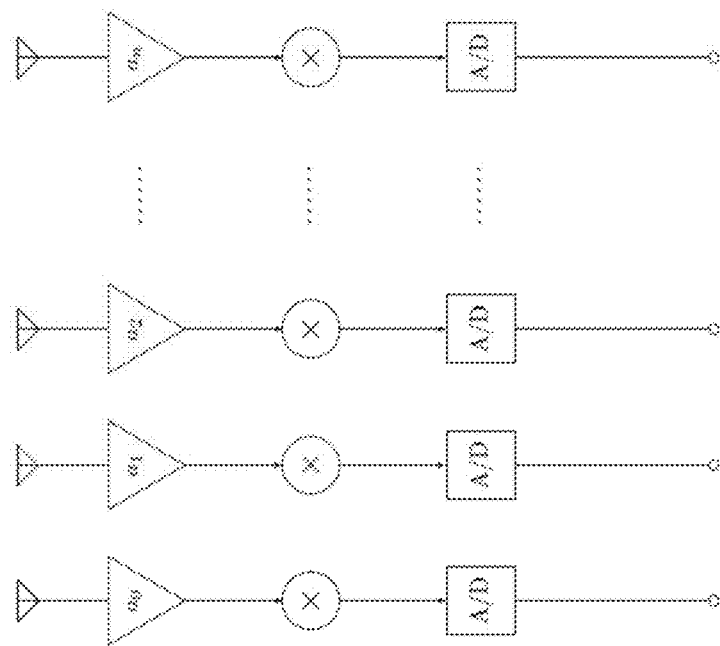

SYSTEMS, METHODS, AND COMPUTER-READABLE MEDIA UTILIZING AN IMPROVED RADIO FRAME DESIGN AND MAC LAYER FOR ULTRA-LOW LATENCY

CROSS-REFERENCE TO RELATED APPLICATION(S)

This application is based upon and claims priority from U.S. Patent Application Ser. No. 62/279,413, filed on Jan. 15, 2016, the entire disclosure of which is incorporated herein by reference.

FIELD OF THE DISCLOSURE

The present application relates generally to the field of wireless communication systems and methods, and more specifically to systems, methods, and apparatus that utilize flexible radio interface configurations for improving the efficiency, latency, and throughput performance of wireless communication transmitters and/or receivers utilizing arrays of antenna elements (e.g., an M-by-N antenna array, where M≥1 and N>1), such as devices and base stations operating at millimeter-wavelength (mmW) frequencies.

BACKGROUND INFORMATION

Wireless communication has evolved rapidly in the past decades as a demand for higher data rates and better quality of service has been continually required by a growing number of end users. Next-generation (so-called "5G") cellular systems are expected to operate at higher frequencies (e.g., millimeter-wavelength or "mmW") such as 5-300 GHz. Such systems are also expected to utilize a variety of multi-antenna technology (e.g., antenna arrays) at the transmitter, the receiver, or both. In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed devices experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In various wireless communication systems, such as cellular systems, there can be fewer constraints on the complexity of the base station compared to the terminal or the mobile unit. In such exemplary cases, a transmit diversity may be feasible in the downlink (i.e., base station to terminal) only and, in fact, may provide a way to simplify the receiver in the terminal. In the uplink (i.e., terminal to base station) direction, due to a complexity of multiple transmit antennas, it may be preferable to achieve diversity by using a single transmit antenna in the terminal multiple receive antennas at the base station.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

In order to achieve these performance gains, MIMO generally provides that both the transmitter and receiver have knowledge of the channel from each transmit antenna to each receive antenna. In some exemplary embodiments, this can be done by the receiver measuring the amplitude and phase of a known transmitted data symbol (e.g., a pilot symbol) and sending these measurements to the transmitter as "channel state information" (CSI). CSI may include, for example, amplitude and/or phase of the channel at one or more frequencies, amplitude and/or phase of time-domain multipath components of the signal via the channel, direction of arrival of multipath components of the signal via the channel, and other metrics known by persons of ordinary skill.

As used herein, "multipath component" can describe any resolvable signal component arriving at a receiver or incident on an antenna array at the receiver. The multipath component can be processed by the receiver at the radio frequency (RF), after conversion to an intermediate frequency (IF), or after conversion to baseband (i.e., zero or near-zero frequency). A plurality of the multipath components can comprise a main component of a transmitted signal received via a primary, direct, or near-direct path from the transmitter to the receiver, as well as one or more secondary components of the transmitted signal received via one or more secondary paths involving reflection, diffraction, scattering, delay, attenuation, and/or phase shift of the transmitted signal. Persons of ordinary skill can recognize that the number and characteristics of the multipath components available to be processed by a receiver can depend on various factors including, e.g., transmit and receive antennas, channel and/or propagation characteristics, transmission frequencies, signal bandwidths, etc.

In the case of a transmit array comprising $N_T$ antennas and a receive array comprising $N_R$ antennas, the receiver can be used to send CSI for $N_T \cdot N_R$ channels to the transmitter. Moreover, in mobile communication environments, these $N_T \cdot N_R$ channels are likely not stationary but vary according to the relative motion between the transmitter and the receiver (e.g., base station and terminal). The rate of change of the channel—and thus the preferable CSI update rate—can be proportional to the relative velocity between the transmitter and the receiver, and the carrier frequency of the signal being transmitted. Further mobile communication systems—including so-called "fifth-generation" or "5G" systems—can utilize mmW frequencies in the 5-300 GHz spectrum, which are substantially higher than the 1-5 GHz spectrum used by today's systems. In addition, increasing the numbers antennas (i.e., $N_T$ and/or $N_R$) is expected to be an important technique for achieving performance goals for 5G systems including high data rates. In fact, as such mmW systems evolve, both the base stations and terminals could potentially utilize a multitude of antenna elements each, with the actual number of elements limited only by the physical area or volume available in each particular application.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

While LTE was primarily designed for user-to-user communications, 5G cellular networks are envisioned to support both high single-user data rates (e.g., 1 Gb/s) and large-scale, machine-to-machine communication involving short, bursty transmissions from many different devices that share the frequency bandwidth. Cellular systems depend on careful scheduling between multiple users to efficiently use the radio link and achieve high levels of spatial reuse. This scheduling demands significant control messaging overhead, which grows with the number of devices. This control messaging overhead includes the CSI reporting discussed above, which becomes doubly expensive as both the number of devices and the number of antenna elements per device increases.

In addition, 5G networks are envisioned to support various applications related to healthcare, logistics, automotive applications, virtual or augmented reality, and mission-critical control. These applications have a common requirement of round-trip (base to UE and back) radio link latencies of approximately 1 ms. This ultra-low latency target is at least an order of magnitude faster than the 10-ms minimum latency currently offered by LTE.

Design of the Medium Access Control (MAC) layer for 5G mmW cellular systems presents unique challenges due to the need for highly directional antennas at both the base station and terminal devices to overcome mmW propagation losses, low latency requirements, and a large number of heterogeneous devices with a wide range of data rates.

Accordingly, it can be beneficial to address at least some of these issues and/or problems with an improved MAC layer design.

SUMMARY OF EXEMPLARY EMBODIMENTS

Accordingly, to address at least some of such issues and/or problems, certain exemplary embodiments of apparatus, devices, methods, and computer-readable media according to the present disclosure can . . . . For example, exemplary embodiments of methods, systems, devices, and computer-readable media according to the present disclosure can vastly out-perform conventional methods, techniques, and systems in various known applications, including exemplary applications discussed herein.

In certain exemplary embodiments of the present disclosure, it is possible to provide a communication apparatus or device (e.g., a radio base station) configured to operate a time-division-duplexed (TDD) radio interface utilizing a plurality of time-domain symbols, and comprising a medium access control (MAC) processor configured and specifically programmed to schedule transmissions to and from a plurality of devices via a plurality of antennas, wherein the scheduling comprises: receiving first data for a downlink transmission to a first device; transmitting a grant to the first device, the grant comprising a first resource allocation for the device to receive the first data and a second resource allocation for the device to transmit a reception status pertaining to the data; and transmitting the first grant and at least one portion of the data in a symbol. In some exemplary embodiments, the scheduling of the second resource allocation is based on the data decoding capability of the device.

In some exemplary embodiments, the apparatus further comprises a physical-layer (PHY) processor configured and specifically programmed to frequency-division multiplex the first grant and the at least one portion of the data in the symbol. In some exemplary embodiments, the PHY processor is configured and specifically programmed to frequency-division multiplex the grant with at least one other grant to a further device in the symbol, and to transmit the symbol spatially multiplexed in at least two streams directed to at least the device and the further device via a plurality of antennas. Other exemplary embodiments include methods and computer-readable media embodying one or more of the procedures that the apparatus is configurable to perform.

Other exemplary embodiments of the present disclosure include a communication apparatus or device (e.g., a radio base station) configured to operate a time-division-duplexed (TDD) radio interface utilizing a plurality of time-domain symbols, and comprising a medium access control (MAC) processor configured and specifically programmed to schedule transmissions to and from a plurality of devices via a plurality of antennas, wherein the scheduling comprises: allocating first radio interface resources to generate a first resource allocation comprising at least one symbol allocated to at least a first device; receiving a scheduling request (SR) from a second device for an uplink data transmission; determining a second resource allocation pertaining to the SR, the second resource allocation comprising at least a portion of the first resource allocation to the first device and an indication that the at least one portion of the first resource allocation is unavailable to the second device; and transmitting the second resource allocation to the second device. In some exemplary embodiments, the first resource allocation is a recurring allocation. In some exemplary embodiments, the plurality of symbols are orthogonal frequency division multiplexed (OFDM) symbols. In some exemplary embodiments, the first resource allocation comprises one or more intervening gaps of unallocated resources, and the second allocation includes at least one of the intervening gaps.

In some exemplary embodiments, the apparatus further comprises a physical-layer (PHY) processor configured and specifically programmed to frequency-division multiplex the second resource allocation to the second device with at least one other resource allocation to a further device in a symbol; and transmit the symbol spatially multiplexed in at least two data streams directed to at least the second device and the further device via a plurality of antennas. Other exemplary embodiments include methods and computer-readable media embodying one or more of the procedures that the apparatus is configurable to perform.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which:

FIGS. 5A-5C are block diagrams showing three exemplary antenna array architectures usable one or more exemplary embodiments of the present disclosure;

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

Figure 1:
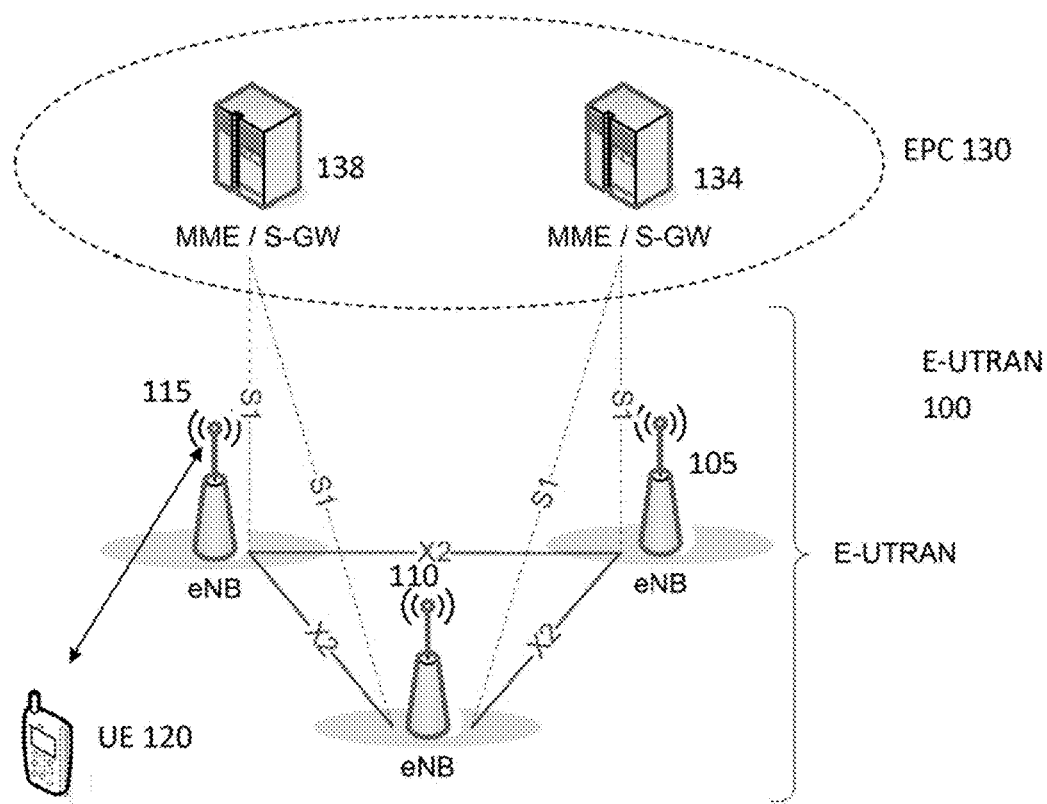
FIG. 1 is a high-level block diagram of an exemplary architecture of the Long Term Evolution (LTE) Evolved UTRAN (E-UTRAN) and Evolved Packet Core (EPC) network, as standardized by 3GPP.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non Access Stratum (NAS) protocols. The S-GW handles all Internet Procotol (IP) data packets between the UE and the EPC, and serves as the local mobility anchor for the data bearers when the UE moves between eNBs, such as eNBs 105, 110, and 115.

Figure 2A:
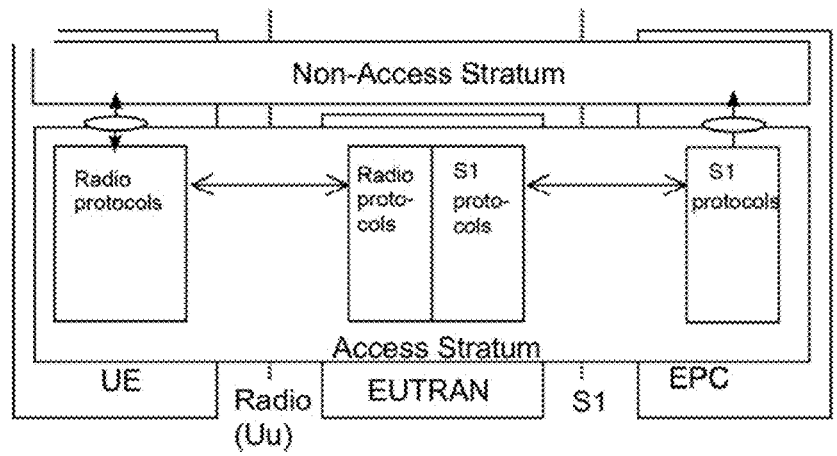
FIG. 2A is a high-level block diagram of an exemplary E-UTRAN architecture in terms of its constituent components, protocols, and interfaces.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

Figure 2B:
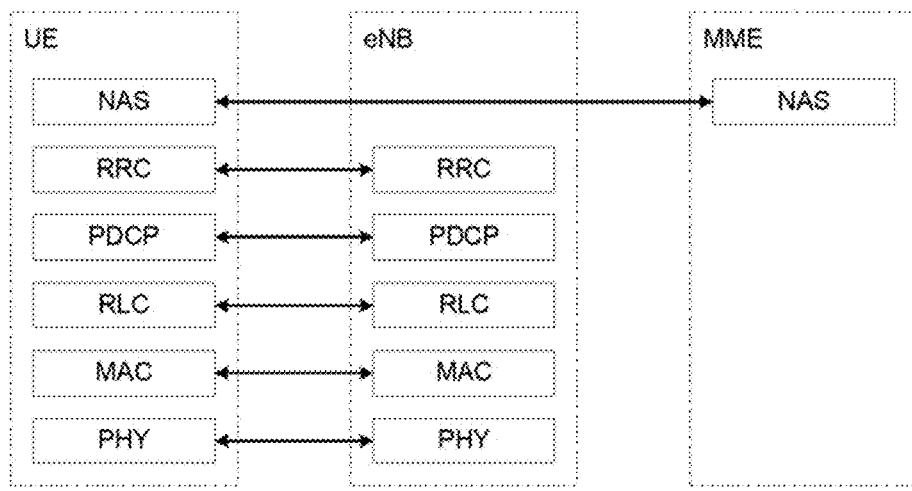
FIG. 2B is a block diagram of exemplary protocol layers of the control-plane portion of the radio (Uu) interface between a user equipment (UE) and the E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

Figure 2C:
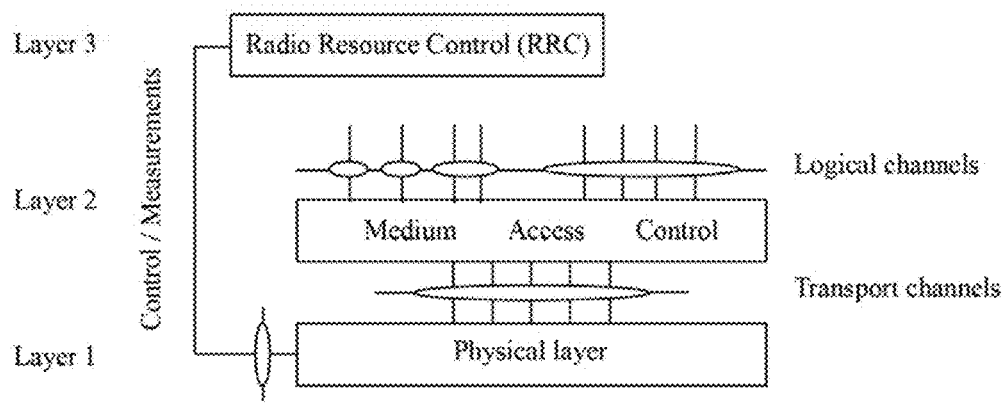
FIG. 2C is a block diagram of an exemplary LTE radio interface protocol architecture from the perspective of the PHY layer.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

Figures 3A, 3B:
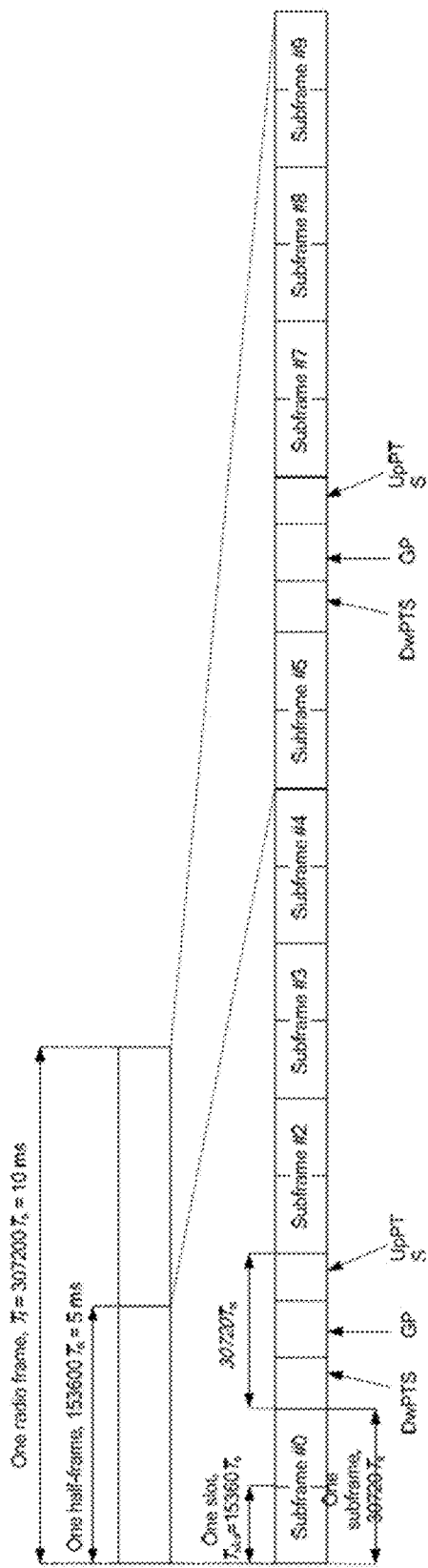
FIG. 3A is block diagram of an exemplary type-2 LTE downlink radio frame structure used for time-division duplex (TDD) operation.
FIG. 3B is a table showing seven exemplary uplink-downlink configurations for an LTE TDD radio frame.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows the radio frame structure ("type 2") used for TDD operation. The radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Various individual subframes can be configured as downlink (D), uplink (U), or special (S) subframes, which consist of a downlink pilot time slot (DwPTS), uplink pilot time slot (UpPTS), and a guard period (GP).

FIG. 3B shows a table of seven exemplary uplink-downlink configurations for an LTE TDD radio frame. For 5-ms downlink-to-uplink switch-point periodicity, an S subframe can occur in both 5-ms half-frames, whereas for 10-ms downlink-to-uplink switch-point periodicity, an S subframe can occur only in the first 5-ms half-frame. Furthermore, subframes 0 and 5 and DwPTS can be reserved for downlink transmission, whereas UpPTS and the subframe immediately following an S subframe can be reserved for uplink transmission. The length of the DwPTS and UpPTS can vary based on configuration, but can be fixed for a particular configuration.

Figure 3C:
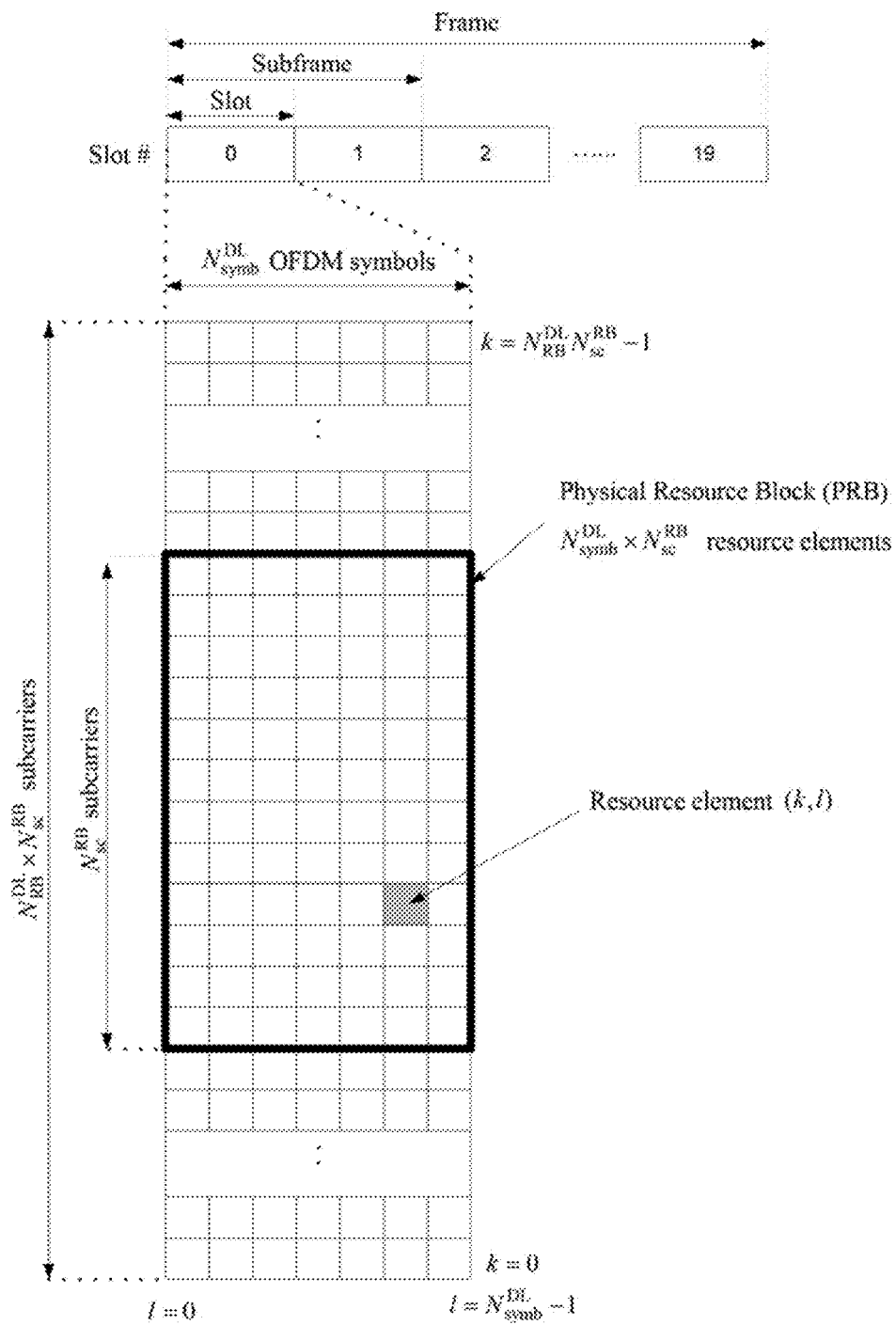
FIG. 3C is an exemplary diagram showing additional details of the exemplary LTE TDD radio frame shown in FIG. 3A.

FIG. 3C shows additional details of the exemplary LTE TDD radio frame shown in FIG. 3A. For example, FIG. 3C illustrates that each exemplary downlink slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as shown in FIG. 3C, but consists of $N^{UL}_{symb}$ OFDM symbols, each of which is comprised of $N_{sc}$ OFDM subcarriers.

As shown in FIG. 3C, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY downlink comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carries 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

As discussed above, the LTE PHY maps the various downlink and uplink physical channels to the resources shown in FIG. 3C. For example, the PDCCH carries scheduling assignments, channel quality feedback (e.g., CSI) for the uplink channel, and other control information. Likewise, a Physical Uplink Control Channel (PUCCH) carries uplink control information such as scheduling requests, CSI for the downlink channel, hybrid ARQ feedback, and other control information. Both PDCCH and PUCCH are transmitted on aggregations of one or several consecutive control channel elements (CCEs), and a CCE is mapped to the physical resource shown in FIG. 3C based on resource element groups (REGs), each of which is comprised of a plurality of REs. For example, a CCE may be comprised of nine (9) REGs, each of which is comprised of four (4) REs.

Figure 4:
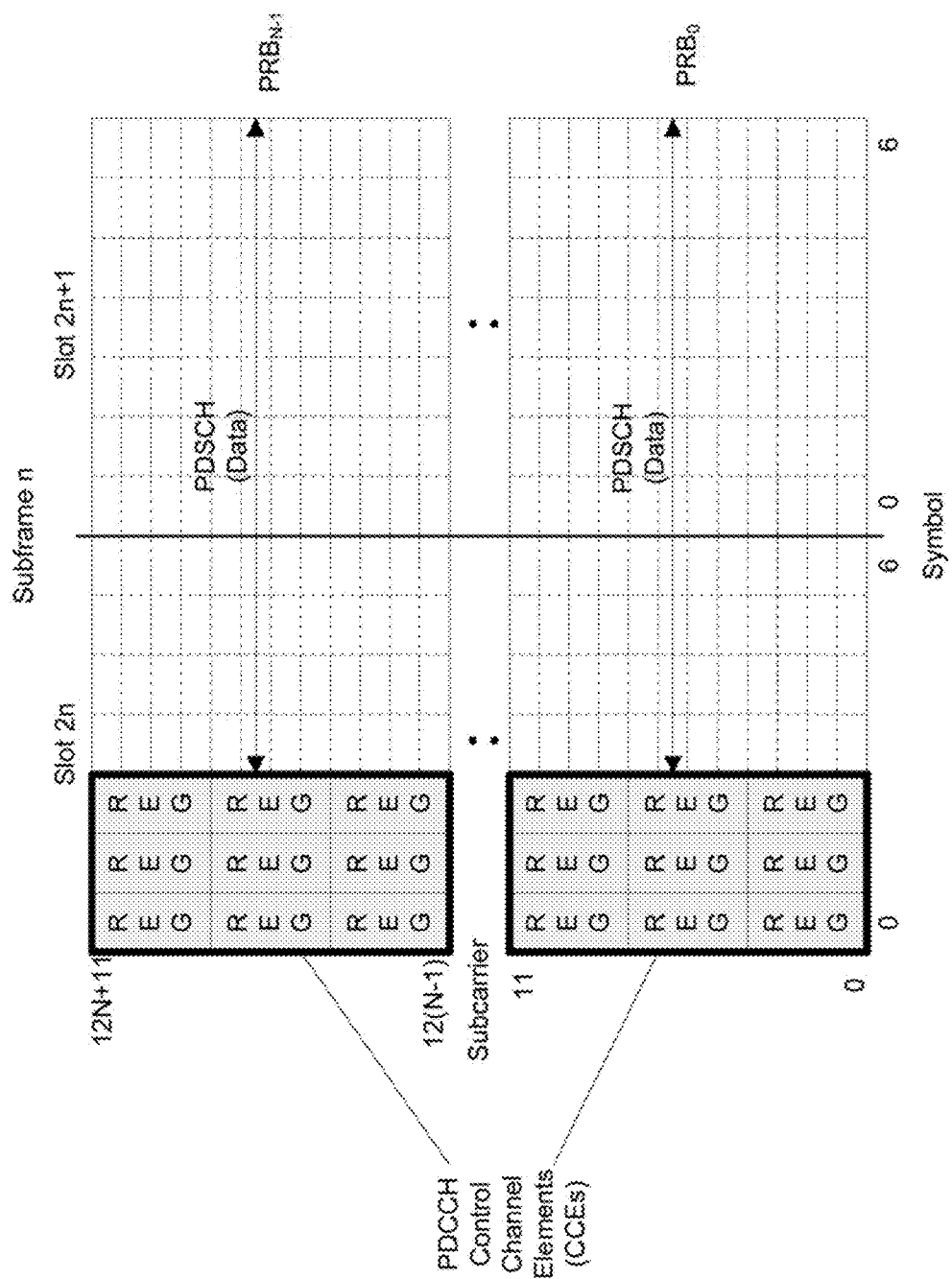
FIG. 4 is a block diagram illustrating one manner in which control channel elements (CCEs) and resource element groups (REGs) for a PDCCH can be mapped with a PDSCH into LTE physical resource blocks (PRBs), according to one or more exemplary embodiments of the present disclosure.

FIG. 4 illustrates one exemplary manner in which the CCEs and REGs can be mapped to the physical resource, i.e., PRBs. As shown in FIG. 4, the REGs comprising the CCEs of the PDCCH can be mapped into the first three symbols of a subframe, whereas the remaining symbols are available for other physical channels, such as the PDSCH which carries user data. Each of the REGs comprises four REs, which are represented by the small, dashed-line rectangles. Since QPSK modulation is used for the PDCCH, in the exemplary configuration of FIG. 4, each REG comprises eight (8) bits and each CCE comprises 72 bits. Although two CCEs are shown in FIG. 4, the number of CCEs may vary depending on the required PDCCH capacity, determined by number of users, amount of measurements and/or control signaling, etc. Moreover, other ways of mapping REGs to CCEs will be apparent to those of ordinary skill in the art. On the uplink, PUCCH can be configured similarly, except that the number of bits per CCE varies because PUCCH uses either QPSK or BPSK depending on particular message contents.

Beginning with Release 11, the 3GPP specifications include an enhanced PDCCH (ePDCCH) in addition to the legacy PDCCH described above. The ePDCCH is intended to increase capacity and improve spatial reuse of control channel resources, improve inter-cell interference coordination (ICIC), and add antenna beamforming and/or transmit diversity support for control channel. Much like the Release 8 PDCCH, the ePDCCH is constructed by aggregating one or more enhanced control channel elements (eCCEs). An eCCE is comprised of one or more enhanced resource element groups (eREGs), each of which is comprised of one or more REs. For example, an eCCE comprised of nine eREGs, each having four REs, may be configured with the same capacity as a CCE. Unlike CCEs, however, eCCEs may be flexibly configured with various numbers and sizes of eREGs.

Moreover, the ePDCCH (i.e., eCCEs) can be mapped to PRBs for transmission either in a localized or a distributed manner. The localized mapping provides frequency selective scheduling gain and beamforming gain while the distributed transmission provides robust ePDCCH transmission via frequency diversity in case valid channel state information is not available to the receiver. In order to achieve sufficient frequency diversity, however, each eCCE must be mapped to a minimum number PRBs distributed sufficiently throughout the range of sub-carriers in the physical resource.

As discussed briefly above, 5G systems can utilize mmW frequencies in the 5-300 GHz spectrum, which are substantially higher than the 1-5 GHz spectrum used by today's systems such as LTE. Increasing the number of antennas (i.e., $N_T$ and/or $N_R$) is expected to be an important technique for achieving performance goals for 5G systems including high data rates. Both the base stations and the terminals can potentially utilize a multitude of antenna elements each, with the actual number of elements limited only by the physical area or volume available in each particular application. In order to achieve many of these exemplary performance improvements and to mitigate difficult operational conditions, multi-antenna mmW systems can generally place difficult performance requirements on the analog-to-digital (A/D, e.g., for a receiver) and/or digital-to-analog (D/A, e.g., for a transmitter) converters employed in conjunction with the array of antennas. As a consequence of the practical limitations, three exemplary antenna array architectures are described for systems utilizing mmW antenna arrays.

Figure 5C:
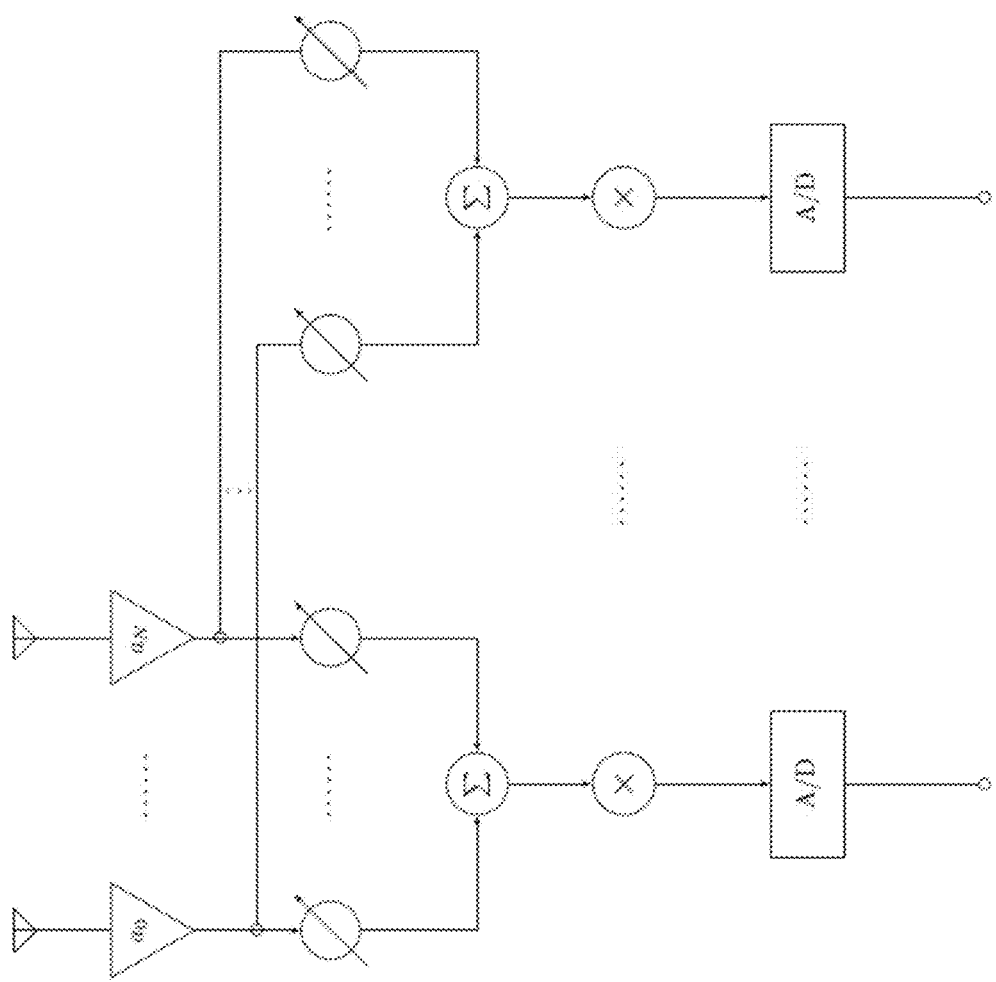

In an exemplary low-resolution digital architecture, the signal from (or to) each antenna element or element cluster is processed by an individual A/D (or D/A) converter. This exemplary architecture is illustrated by the block diagram shown in FIG. 5A. This exemplary architecture can be flexible because it is able to support an arbitrary number of spatial streams and can also provide spatial division multiplexing to communicate to multiple devices simultaneously. However, this architecture can be prohibitive in energy consumption, particularly if the A/D and/or D/A converters are run at a high sampling rate and/or a high quantization resolution. Consequently, such architectures typically are operated at lower sampling rate and/or lower quantization resolution to compensate for the larger number of A/D and/or D/A converters.

In an exemplary high-resolution analog architecture, the analog signals from (or to) the antenna elements are first combined by an analog phased array, either at radio frequency (RF) or at intermediate frequency (IF, e.g., before or after the mixer). This exemplary architecture is illustrated by the block diagram shown in FIG. 5B. The combined signal can then be processed by a single A/D (or D/A) converter. Since this design requires only one A/D or D/A, it uses less energy compared to the fully digital approach and therefore can be run at a much higher quantization resolution. However, the analog architecture has the limitation that the phased array can be oriented in only one direction at a time, thereby limiting the multiple access and searching capabilities.

In a third exemplary architecture, e.g., a hybrid beamsteering architecture, the collection of antenna elements is divided into a plurality of clusters. Signals from all antenna elements in a cluster are combined into a single analog signal, which is then individually digitized with a single A/D converter. In the transmit direction, for example, a single D/A generates a composite analog signal that is then split into multiple signals, each fed to a particular antenna element of the cluster. This architecture is a compromise in both performance and energy consumption between the high-resolution analog and the low-resolution digital architectures. This architecture has been advocated for future millimeter wave wireless systems, as described by A Ghosh, et. al., "Millimeter-Wave Enhanced Local Area Systems: A High-Data-Rate Approach for Future Wireless Networks," IEEE JSAC, June 2014. A related architecture is described by Alkhateeb et al., "Hybrid Precoding for Millimeter Wave Cellular Systems with Partial Channel Knowledge," Proc. 2013 IEEE Workshop on Information Theory and Applications. This exemplary architecture is illustrated by the block diagram shown in FIG. 5C.

Neither the low-resolution digital architecture nor the high-resolution analog architecture can be optimal for all scenarios in mobile wireless (e.g., cellular) applications. Moreover, the hybrid beamstearing architecture is inherently suboptimal for certain scenarios, since the determination of how to cluster antenna elements and the number of operational A/D and/or D/A elements are not configurable. For example, when searching for other wireless peers or tracking of the signals from those peers, a low-resolution digital architecture may offer greatly improved performance over a high-resolution analog architecture because it allows all directions to be scanned at once. The low quantization resolution on each antenna signal generally does not affect the performance since the signals are limited by thermal noise and interference rather than quantization noise. A similar situation can occur for transmitting and receiving control signals or any other signals that are designed for a low signal-to-noise ratio (SNR). One example has been described in Barati, et al, "Directional Cell Search for Millimeter Wave Cellular Systems", Proc. IEEE SPAWC, 2014. In contrast, during steady-state data reception and transmission, the high-resolution analog architecture can be preferable. In such exemplary scenario, the direction of communication has generally already been established (or at least is changing relatively slowly) and the array of antenna elements can be oriented in a single direction. The high quantization resolution is useful to enable transmission and reception at higher SNRs.

Figure 6:
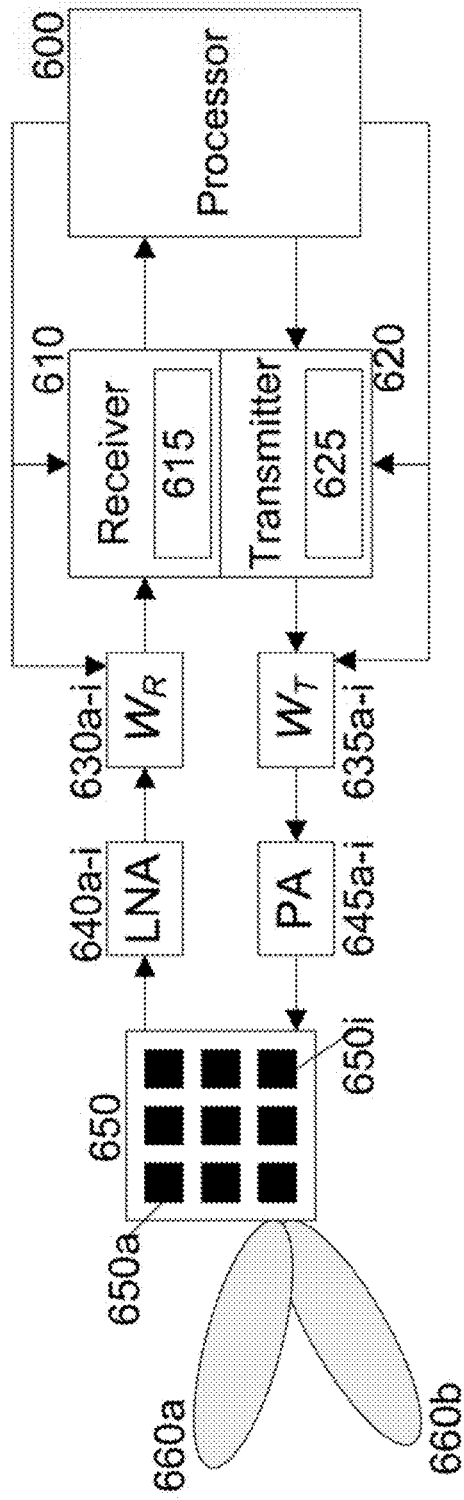
FIG. 6 is a block diagram of an exemplary apparatus and/or device according to one or more exemplary embodiments of the present disclosure.

FIG. 6 shows a block diagram of an exemplary apparatus and/or device according to one or more embodiments of the present disclosure. In various exemplary embodiments, the apparatus and/or device illustrated by FIG. 6 can comprise one or more of the antenna array architectures shown in FIGS. 5A-5C and described above. The exemplary apparatus shown in FIG. 1 can also include, e.g., an antenna array 650 that can comprise a plurality of individual antenna elements arranged in a particular pattern, such as, e.g., exemplary antenna elements 650a to 650i arranged in an exemplary 3-by-3 grid. In some exemplary embodiments, the antenna array 650 can be arranged as an M-by-N array of elements, where M≥1 and N>1. In some exemplary embodiments, the antenna elements 650a to 650i can be arranged in a rectangular grid with equal spacing in one or both dimensions; however, other exemplary arrangements of the elements comprising the array are possible and are within the scope of the present disclosure. In addition, each element of the antenna array 650 can have various physical forms including dipole, patch, cross dipole, inverted F, inverted L, helix, Yagi, rhombic, lens, and/or any another type of antenna topology known to persons of ordinary skill. Elements 650a to 650i can utilize various polarization patterns known to persons of ordinary skill, including horizontal, vertical, circular, and cross polarization. For example, elements 650a to 650i—as well as their arrangement in the array 650—can be designed or configured especially for the particular operating frequency (e.g., 5 GHz, 10 GHz, 300 GHz, etc.) and device (e.g., mobile or fixed-location terminal, cellular phone, handset, laptop, tablet, access point, base station, etc.) in which the exemplary apparatus of FIG. 1 can be used.

According to certain exemplary embodiments of the present disclosure, the antenna elements 650a to 650i can be used for receiving and/or transmitting signals in combination with, respectively, other receiving and transmitting circuitry comprising the exemplary apparatus. The receiving circuitry can comprise a plurality of low-noise amplifiers (LNAs) 640a through 640i, each of which amplifies a signal received from a corresponding antenna element 650a through 650i. The exemplary apparatus can further comprise a plurality of receive gain/phase controls 630a through 630i, each of which can receive a signal output from a corresponding (LNAs) 640a through 640i. In some exemplary embodiments, the receive gain/phase control 630 can comprise a receiver beamformer that can be controlled by, e.g., one or more processors 600. The outputs of the receive gain/phase controls 630a through 630i are provided to a receiver block 610, which can comprise a receive conversion block 615. The inputs to block 610 can be at a particular radio frequency (RF), in which case block 610 can comprise circuitry configurable to translate the signals to an intermediate frequency (IF). Nevertheless, the skilled person can readily comprehend that RF-to-IF conversion can alternately occur prior to the signals reaching receiver block 610. As indicated herein, references to "processor" should be understood to mean one or more processors, including one or more computer processors, signal processors, etc.

The output of block 615 can comprise one or more streams of digitized samples that are provided to processor 600, which can provide one or more receiver control signals for controlling various operational aspects of, e.g., receive gain/phase controls 630a through 630i, receive conversion block 615, etc. Similarly, processor 600 can provide one or more streams of digitized samples to transmitter block 620, which can comprise a transmit conversion block 625. The output of block 620 (e.g., the output of transmit conversion block 625) can comprise a plurality of analog signals, each of which can be at RF or IF, as described above for the receiving circuitry. Each of the analog signals output by transmitter block 620 can be applied to a corresponding transmit gain/phase control 635a through 635i. Processor 600 can also provide one or more transmitter control signals for controlling various operational aspects of, e.g., transmit gain/phase controls 635a through 635i, transmit conversion block 625, etc. In some exemplary embodiments of the present disclosure, transmit gain/phase control 635 can comprise a transmit beamformer that can be controlled by, e.g., processor 600. Each of the signals output by transmit gain/phase control 635a through 635i can be applied to a corresponding transmit power amplifier (PA) 645a through 645i. The amplified outputs of the PAs can be applied to respective corresponding antenna array elements 650a through 650i.

In some exemplary embodiments of the present disclosure, processor 600 can utilize a direction-of-arrival estimate to determine appropriate weights (e.g., $W_R$ or $W_T$) to cause the antenna array 650 to produce one or more beam patterns corresponding to the estimated direction of arrival. For example, as shown in FIG. 1, by applying the appropriate weights (e.g., $W_R$ or $W_T$) to the signals received from the antenna elements 650a through 650i, the antenna array 650 can capture signals and/or multipath components that are incident in the directions of arrival corresponding to beams 560a and 560b while rejecting signals and/or multipath components that are incident other directions of arrival. Processor 600 can program and/or configure receive gain/phase controls 630 and/or transmit gain/phase controls 635 with weights (e.g., $W_R$ or $W_T$, respectively) corresponding to the estimated direction of arrival. Processor 600 can determine weights using various beam-steering or beam-forming algorithms know to persons of ordinary skill, including parametric algorithms and codebook-based algorithms. According to various exemplary embodiments of the present disclosure, receive gain/phase controls 630 and/or transmit gain/phase controls 635 can comprise one or more programmable amplifiers that modifies the amplitude and/or phase of the signals (e.g., at RF or IF) from the array elements 650a through 650i. When no gain or phase adjustment of the signals to/from array elements 650a through 650i is required, the processor 600 can program the respective elements of controls 630 and/or 635 to unity gain and zero phase.

In further exemplary embodiments of the present disclosure, processor 600 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 600 can be programmable and/or configured to perform the functions described herein by executable software code stored in an accessible memory or other type of computer-readable medium. In some exemplary embodiments of the present disclosure, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

More generally, persons of ordinary skill in the art will recognize that various protocols and other functions of the exemplary device shown in FIG. 6 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware. For example, such various combinations can be utilized to execute various communication protocols (e.g., PHY, MAC, RLC, RRC, etc.) specified by 3GPP and improve-ments described herein, including protocols related to exemplary embodiments that utilize the flexible radio interface.

As discussed above, the LTE frame structure uses a fixed transmission time interval (TTI) and, in the TDD variant, a fixed distribution of uplink (UL) and downlink (DL) subframes within a frame. This type of arrangement, even with scaling, can underutilize the high degrees of freedom offered by 5G mmW systems. This problem does not occur for LTE since small MAC-layer protocol data units (PDUs) can be allocated a very small portion of the bandwidth (e.g., one resource block (PRB) for the duration of a subframe), with the remainder of the bandwidth (e.g., other PRBs in the same subframe) being assigned to other devices (UEs) in a frequency-division multiple access (FDMA) arrangement.

This arrangement is based on the assumption that all assigned devices can receive the FDMA signal at the same time. The use of highly-directional antennas in the base station and devices can create difficulties for this assumption. The use of digital or hybrid beamforming enables the base station to create multiple, simultaneous beams, each of which can be directed to one or more users in a spatial multiplexing arrangement. For example, the base station can transmit an uplink resource grant or scheduling assignment to one device using one PRB and high-speed downlink data to other devices in the remaining PRBs. The base station would apply the full-bandwidth, FDMA signal to all beams directed to the various devices.

However, when the base station uses less complex analog beamforming with a phased array and a single A/D conversion path (as shown, e.g., in FIG. 5A), the base station can only form a single directed beam at any time. In such case, other devices outside of that beam likely cannot receive the OFDM signal including the other assigned PRBs. For example, the base station cannot transmit uplink resource grants multiple devices simultaneously. In such cases, FDMA scheduling is not possible and thus the entire bandwidth must be allocated to one device for the entire subframe.

The potential resource wastage increases with the downlink bandwidth (e.g., $N_{sc}$ OFDM subcarriers as shown in FIG. 3C), and will be particularly problematic as proposed 5G mmW systems utilize much wider bandwidths than 4G LTE systems in order to attain the Gb/s data rates that are envisioned. Although use of digital or hybrid beamforming can mitigate such resource wastage, the added complexity (e.g., A/Ds and D/As) and power consumption of these configurations can dictate the use of analog beamforming in some circumstances. In such case, more efficient ways to allocate the channel are needed and/or desirable.

Moreover, the LTE HARQ scheduling mechanisms are likely inadequate to meet to the stringent requirements of low round-trip latency in 5G mmW systems. The scheduling of HARQ transmissions from the devices within the radio interface should be improved and/or optimized to efficiently manage the various data transmission demands. Specifically, more flexible scheduling of HARQ transmissions is needed. More generally, reliable transmission of the physical layer control messages is needed while ensuring that the overhead due to these messages and resource wastage due to their scheduling are minimized.

Various exemplary embodiments of the present disclosure can overcome these and other deficiencies of the LTE radio interface as applied to 5G mmW systems. For example, these exemplary embodiments can utilized a TDD radio interface based on a flexible (e.g., variable) TTI rather than the fixed TTI used in the LTE TDD variant. Such exemplary embodiments can efficiently support highly-directional transmission and reception of control messages such as scheduling requests, CQI, ACK, and scheduling assignments/resource grants. Various exemplary embodiments can utilize a flexible subframe arrangement to enable efficient transmission of small packets with low latency and minimal overhead.

Similar to LTE, such exemplary embodiments of the present disclosure can utilize OFDM for the physical layer. Since 5G mmW systems can utilize much smaller cell radii (100-200 m) with low delay spread, however, exemplary embodiments can employ an OFDM symbol period much shorter than LTE, e.g., 4 µs symbol period. Utilizing such a short symbol period can enable efficient transmission of control messages (e.g., ACK, CSI, scheduling requests, assignments, etc.) to/from individual devices utilizing highly-directional antennas, without wasting system bandwidth.

In various exemplary embodiments of the present disclosure, the radio interface timing can be divided into subframes consisting of an integer number of the shorter-duration OFDM symbols with additional spacing for UL/DL switching. Each subframe can be further divided into a control and a data portion. Similar to LTE, the control portion can be used for various control messages such as HARQ ACKs, scheduling requests, resource grants, channel quality reports (e.g., CSI), etc. In some exemplary embodiments, the control portion can be transmitted at the beginning of a subframe. Resources (e.g., PRBs) within each subframe can be assigned to one or many users, depending on the traffic demands. According to some exemplary embodiments, the minimum per-user allocation is one symbol, whereas in other exemplary embodiments (e.g., when the transmitting antenna array has the capability to transmit in multiple directions simultaneously) multiple users can be allocated within a single symbol in an FDMA arrangement.

In certain exemplary embodiments of the present disclosure utilizing the flexible radio interface, various information related to the timing and/or configuration of the radio interface can be conveyed from the base station to the device, e.g., in a scheduling or resource grant message. The flexibility of such embodiments provides advantages such enabling transmission of small packets without wasting resources. For example, both the subframe duration and the duration of individual data transmissions within the subframe can be transmitted from the base station to devices. In some exemplary embodiments, the direction of the transmission (UL or DL) can also be conveyed in the resource grant to support a dynamic TDD arrangement. The timing or location of a device's HARQ ACKs within a subframe can be conveyed in a scheduling message from the base station. In some embodiments, the base station can determine HARQ ACK timing or location based on the device's decoding capability of the receiver and/or resource availability.

According to some exemplary embodiments of the present disclosure, various transmissions that are known to occur or are required on a regular, periodic basis can be pre-scheduled by the base station for one or more users or devices, e.g., by allocating one or more PRBs in a symbol at a recurring position in every $n^{th}$ subframe, where $n \geq 1$. For example, in order to enable the base station to adapt the downlink data rate to the particular radio conditions of each device, each device can transmits channel quality indicator (CQI) reports periodically or regularly on a dedicated uplink (UL) control channel. Devices can also utilize such a dedicated control channel to transmit indications of the channel spatial rank for MIMO. In addition, each active device must be given a regular opportunity to transmit a scheduling request (SR) indicating that it has UL data to be transmitted to the base station. Such dedicated channels and transmission opportunities can be allocated a regular position in every $n^{th}$ subframe. Dynamic, non-recurring data transmissions would thus need to be allocated around these semi-statically fixed transmissions.

In such exemplary case, the base station can subsequently transmit control message(s) to other devices indicating that the pre-allocated portions of the subframe are unavailable for use. In some embodiments, the base station can allocate to a single device UL or downlink (DL) resources (e.g., an entire timeslot) that span one or more of these unavailable portions (e.g., one or a small number of symbols). By using the combination of its own resource grant and the unavailable indicators, a device can be configured to transmit (or receive) data during its allocation except the pre-allocated portions indicated by such control messages.

As discussed above, such exemplary embodiments utilizing a flexible radio interface dramatically improve bandwidth efficiency for transmitting short packets. More specifically, the 4G LTE fixed radio interface can be only 50% bandwidth-efficient for such traffic, whereas the embodiments of the present disclosure can be much more bandwidth-efficient. Furthermore, even for base stations utilizing the less-complex analog beamforming with a single stream, the flexible radio interface enables control channels to be transmitted efficiently in a highly-directional, time-multiplexed manner (e.g., one device at a time) by utilizing the shorter OFDM symbol duration. Moreover, if the base station utilizes spatial multiplexing—either by hybrid or fully digital multi-stream beamforming architectures—exemplary disclosed embodiments can provide a potentially significant reductions in control overhead.

Figure 7:
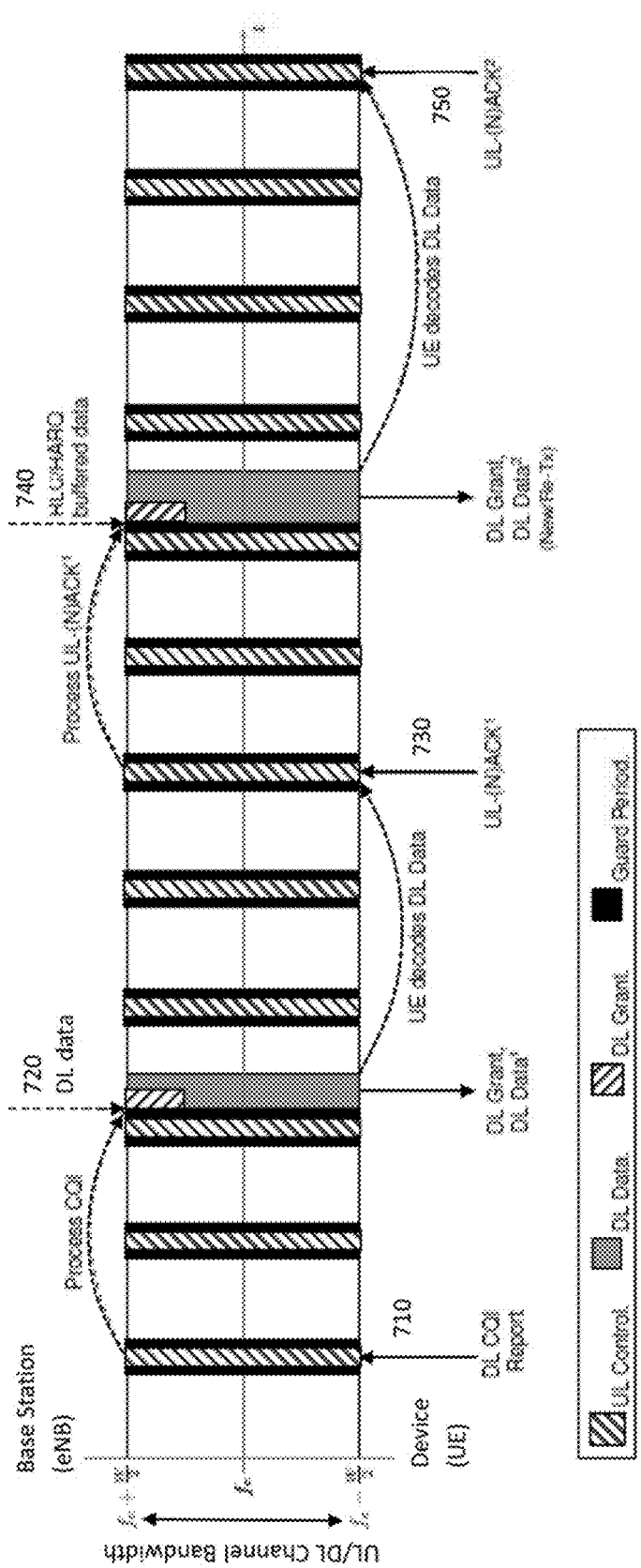
FIG. 7 is an exemplary timing diagram of downlink radio interface scheduling according to one or more exemplary embodiments of the present disclosure.

FIG. 7 shows an exemplary timing diagram of downlink radio interface scheduling utilizing one or more embodiments of the present disclosure. Such exemplary downlink radio interface scheduling can be used, for example, in a 5G mmW system. In particular, FIG. 7 illustrates an exemplary timing of various communications between a single device and a base station. For example, as indicated by the legend, the radio interface timing shown in FIG. 7 includes a recurring allocation for UL control transmission from the device, similar to the dedicated UL control resources similar to the LTE PUCCH. Such exemplary recurring allocation can be pre-allocated according to embodiments described herein. In various exemplary embodiments of the present disclosure, each recurring UL control allocation can be the entire available channel bandwidth (e.g., all available OFDM subcarriers) during one or a small number of OFDM symbols. As shown in FIG. 7, each allocation is immediately preceded and succeeded by a guard period used for transmit-receive switching, during which no transmissions occur.

During allocation 710, the device can transmit a downlink (DL) channel quality indicator (CQI) to the base station. The device can transmit additional DL CQI reports prior or subsequent to transmitting during allocation 710. The device can transmit the CQI report(s) using the entire channel bandwidth (e.g., all available OFDM subcarriers) as shown in the figure. The base station subsequently processes the CQI report received during 710, along with other CQI reports from the device if available. The base station also receives downlink (DL) data to be transmitted to the device, e.g., from an external source. At 720, the base station transmits the DL data to the device using all available OFDM subcarriers during a sufficient number of OFDM symbols. In addition, the base station includes a DL grant to the device indicating that these DL resources carry data intended for the device. The DL grant can be transmitted temporally during the beginning of the DL resources used, e.g., during the first OFDM symbol used. Such exemplary placement can facilitate the device to rapidly determine that it has been granted the allocated resources for receiving the remaining DL data.

After receiving the DL data, the exemplary device can decode it to determine whether the data was received correctly or with errors. As part of an HARQ protocol, the device can inform the base station of reception status by sending a positive or negative acknowledgement (ACK or NACK) on the UL. In allocation 730, the device sends a NACK corresponding to the data received with errors during DL allocation 720. The base station subsequently receives and processes the NACK and uses another downlink allocation 740 to resend the data along with another DL resource grant to the device, similar to 720 described above. The device receives the grant and data during 740, processes the received data, and subsequently responds with an ACK or NACK accordingly.

As indicated above, FIG. 7 illustrates exemplary scheduling of a recurring allocation for UL control transmission that the device can use, for example, to transmit HARQ ACK/NACK. In other exemplary embodiments, such a recurring allocation for transmitting ACK/NACK may not exist. In such exemplary cases, the base station can allocate a non-recurring resource for the device to transmit each ACK/NACK. For example, the base station can provide the UL ACK/NACK resource grant together with the DL data grant to which the UL ACK/NACK pertains. For example, in FIG. 7, the base station can provide an UL ACK/NACK grant during allocation 720. The base station can determine the timing (e.g., which symbol) of the allocation for the UL ACK/NACK grant for the device base on factors such as the overall availability of the channel resource, allocations scheduled for other devices sharing the channel resource, the quantity and/or priority of data in UL buffers (e.g., in devices) and DL buffers (e.g., in base station) waiting to be transmitted, the size of the DL data grant to the device, and the receiving and/or decoding capabilities of the device with respect to the DL data.

Figure 8:
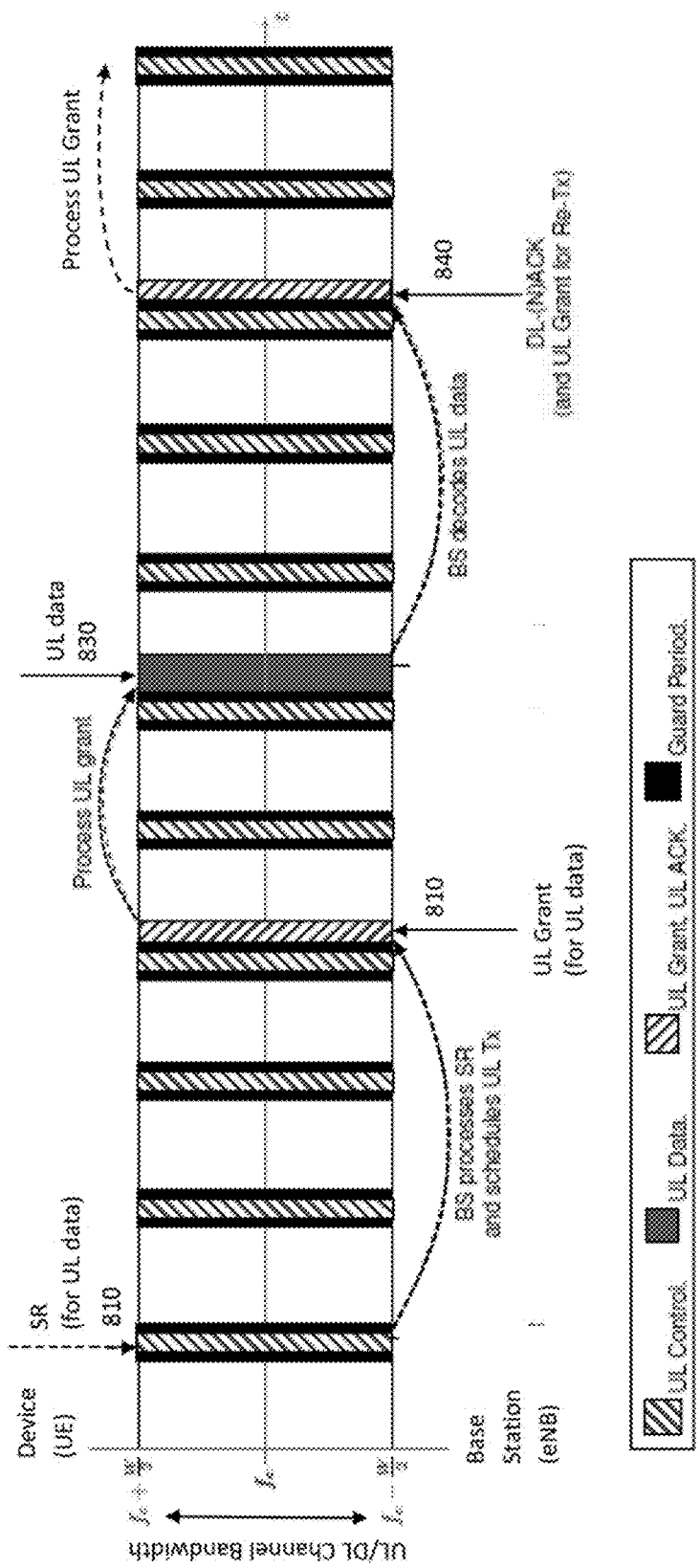
FIG. 8 is an exemplary timing diagram of uplink radio interface scheduling according to one or more exemplary embodiments of the present disclosure.

FIG. 8 shows an exemplary timing diagram of UL radio interface scheduling utilizing one or more embodiments of the present disclosure. Such exemplary UL radio interface scheduling can be used, for example, in a 5G mmW system. In particular, FIG. 8 illustrates an exemplary timing of various communications between a single device and a base station. For example, as indicated by the legend, the radio interface timing illustrated in FIG. 8 includes a recurring allocation for UL control transmissions from the device plus surrounding guard period, similar to describe above for FIG. 7.

Initially, the exemplary device receives data (e.g., image, video, voice conversation, email, text message, etc.) to be transmitted to a remote location over the UL to the base station. The device sends a scheduling request (SR) corresponding to this data during allocation 810. The SR can identify parameters related to the data such as amount or quantity (e.g. bytes), priority, time-sensitivity, etc. The base station receives and processes the SR information, scheduling the device to transmit the data during future resource allocation 830 and transmitting an UL resource grant identifying this future allocation to the device during allocation 820. In some exemplary embodiments of the present disclosure, the base station can transmit the UL resource grant on a common control channel (e.g., PDCCH) that can be received by a plurality of devices. After receiving the resource grant, the device transmits the UL data during allocation 830. After receiving the UL data, the base station can decode it to determine whether the data was received correctly or with errors. Similar to the downlink HARQ, the base station can inform the device of UL data reception status by sending an ACK or a NACK. In the case of a NACK, the base station can also provide the device with another UL resource grant for retransmission of the UL data. According to further exemplary embodiments of the present disclosure, the base station can send the ACK (or NACK and grant) on a common control channel (e.g., PDCCH).

Figure 9:
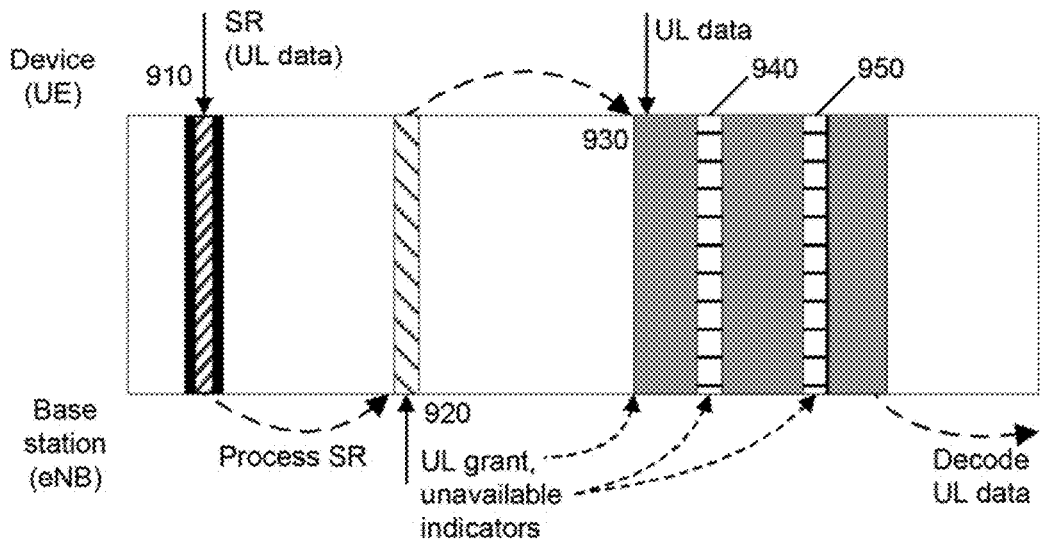
FIG. 9 is another exemplary timing diagram of uplink radio interface scheduling according to one or more exemplary embodiments of the present disclosure.

FIG. 9 shows another exemplary timing diagram of UL radio interface scheduling utilizing one or more embodiments of the present disclosure. Such exemplary UL radio interface scheduling can be used, for example, in a 5G mmW system. In particular, FIG. 9 illustrates an exemplary timing of various communications between a plurality of devices (e.g., first, second, and third devices) and a base station. Initially, a first device receives data (e.g., image, video, voice conversation, email, text message, etc.) to be transmitted to a remote location over the UL to the base station. The first device sends a scheduling request (SR) corresponding to this data during allocation 910, which in some embodiments can be a recurring allocation. The SR can identify parameters related to the data such as amount or quantity (e.g. bytes), priority, time-sensitivity, etc. The base station receives and processes the first device's SR information, SRs or other information received from the second and third devices, and/or previously scheduled allocations for the second and third devices. During allocation 920, the base station transmits an UL resource grant to the first device identifying future allocation 930, along with two unavailability indicators that identify particular portions 940 and 950 (e.g., one or more symbols) within allocation 930 that are unavailable to be used by the first device. These portions can be unavailable, for example, because they were previously allocated to the second and third devices, respectively.

In some exemplary embodiments of the present disclosure, the base station can transmit the UL resource grant with unavailability indicator(s) on a common control channel (e.g., PDCCH) that can be received by a plurality of devices. After receiving the UL resource grant, the device transmits the UL data during allocation 930, but does not transmit UL data during unavailable portions 940 and 950. After receiving the UL data, the base station can decode it to determine whether the data was received correctly or with errors and inform the device of UL data reception status by sending an ACK or a NACK (not shown in FIG. 9).

Although the exemplary scheduling shown in FIG. 9 depicts one or more unavailability indicators associated with and being conveyed in the same message as an UL resource grant, other exemplary arrangements are possible. For example, the base station can transmit a plurality of unavailability indicators that are unassociated with any particular UL resource grant but rather describe unavailable portions of a future duration of the radio interface, e.g., the next subframe. Such "global" unavailability indicators can be transmitted, for example, in a message that can be received by all devices in the coverage area, such as on PBCH or PCFICH. In such embodiments, devices can combine the global unavailable indicators with any received resource grant to determine the particular allocations for transmission.

Figure 10:
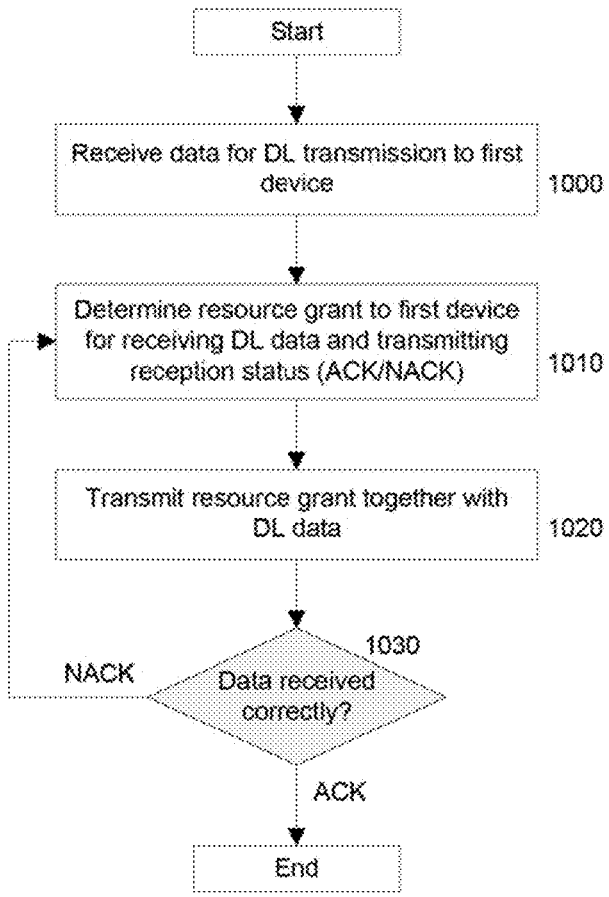
FIG. 10 is a flow diagram of an exemplary method and/or procedure for scheduling data transmissions in a flexible radio interface, according to one or more exemplary embodiments of the present disclosure.

FIG. 10 shows a flow diagram of an exemplary method and/or procedure for scheduling data transmissions in a flexible radio interface, according to one or more exemplary embodiments of the present disclosure. The exemplary method shown in FIG. 10 can be implemented, for example, in a communication apparatus and/or device (e.g., radio base station) configured to operate a time-division-duplexed (TDD) radio interface utilizing a plurality of time-domain symbols. While the exemplary method/procedure illustrated in FIG. 10 is described in terms of being performed by network equipment (e.g., base station or base station component) in relation to communication from the network equipment to a device (e.g., a UE or component of a UE, such as a modem), in some embodiments it can be performed by a device in relation to communication from the device to the network equipment or to one or more other devices. Although the method is illustrated by blocks in the particular order of FIG. 10, this order is merely exemplary and the steps of the method may be performed in a different order than shown by FIG. 10, and may be combined and/or divided into blocks having different functionality.

For example, in block 1000, the network equipment receives DL data to be transmitted to the device, e.g., from an external source. In block 1010, the network equipment determines a resource grant for the device, the resource grant comprising a first resource allocation for the device to receive the DL data and a second resource allocation for the device to transmit a reception status (e.g., HARQ ACK/NACK) pertaining to the DL data. In some exemplary embodiments of the present disclosure, the second resource allocation can be based on one or more of the data decoding capability of the first device and the availability of radio interface resources subsequent to the first resource allocation. According to further exemplary embodiments of the present disclosure, the network equipment may have already allocated resources to one or more other devices (e.g., in response to one or more scheduling requests) for transmitting data, and the scheduling of the second resource allocation for reception status can be based on those previous allocations.

In block 1020, the network equipment transmits the resource grant to the device. In some exemplary embodiments, the resource grant is frequency-division multiplexed with at least one other grant to another device in an OFDM symbol, which is transmitted in at least two streams directed to the first device and the other device via an antenna array (e.g., using digital or hybrid beamforming, discussed above). Subsequently, during the period of the second resource allocation, the network equipment receives the reception indicator from the device. In block 1030, the network equipment determines if the indicator comprises an ACK or a NACK. If an ACK, the exemplary method and/or procedure terminates with respect to this particular data transaction. If a NACK, it returns to block 1010, where the network equipment determines a new resource allocation for retransmission to the device, e.g., a third resource allocation for the device to receive the DL data and a fourth resource allocation for the device to transmit an updated reception status. This cycle can continue until the data is correctly received, or it can terminate after some number of unsuccessful reception attempts.

Figure 11:
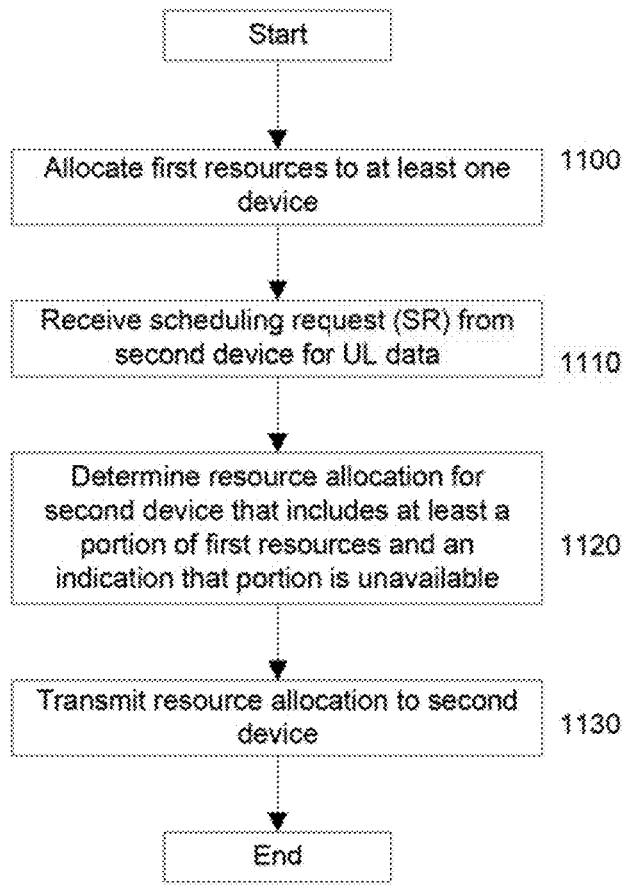
FIG. 11 is a flow diagram of another exemplary method and/or procedure for scheduling data transmissions in a flexible radio interface, according to one or more exemplary embodiments of the present disclosure.

FIG. 11 shows a flow diagram of another exemplary method and/or procedure for scheduling data transmissions in a flexible radio interface, according to one or more exemplary embodiments of the present disclosure. The exemplary method illustrated in FIG. 11 can be implemented, for example, in a communication apparatus and/or device (e.g., radio base station) configured to operate a time-division-duplexed (TDD) radio interface utilizing a plurality of time-domain symbols. While the exemplary method/procedure of FIG. 11 is described in terms of being performed by network equipment (e.g., base station or base station component) in relation to communication from the network equipment to a device (e.g., a UE or component of a UE, such as a modem), in some embodiments it can be performed by a device in relation to communication from the device to the network equipment or to one or more other devices. Although the method is illustrated by blocks in the particular order of FIG. 11, this order is merely exemplary and the steps of the method may be performed in a different order than shown by FIG. 11, and may be combined and/or divided into blocks having different functionality.

For example, in block 1100, the network equipment allocates first radio interface resources to a first device. This first allocation can be in response to, for example, a scheduling request and can comprise at least one symbol (e.g., an OFDM symbol). Furthermore, this first allocation can be recurring (e.g., periodic) or non-recurring. In some embodiments, the first allocation can comprise resources allocated for a plurality of devices in response to a plurality of scheduling requests. Such resources can be allocated contiguously or non-contiguously, e.g., with intervening gaps of non-allocated resources.

In block 1110, the network equipment receives a new scheduling request from another device for UL data transmission. The scheduling request can include, for example, the quantity and/or priority of the data to be transmitted. In block 1120, the network equipment determines a second resource allocation in response to the new scheduling request. For example, the network equipment can allocate resources surrounding at least a portion of the first allocation and/or include one or more intervening gaps in the first allocation. The network equipment can identify the second resource allocation as a contiguous block surrounding the portion(s) of the first allocation, together with an indicator of unavailability for those portions. An example of such an allocation is shown by FIG. 9, described above. After determining the second resource allocation including the unavailable portions, the network equipment transmits this information in a resource grant in response to the new scheduling request received in block 1110.

Figure 12:
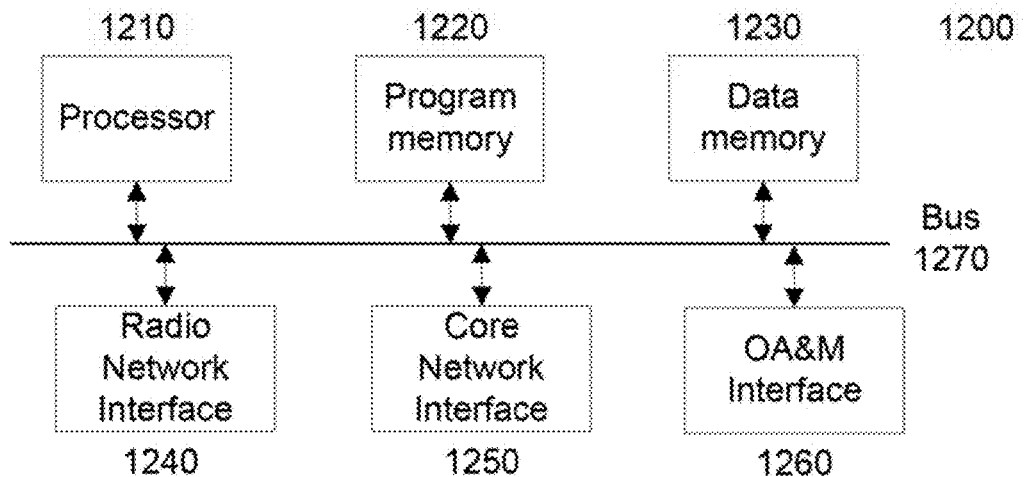
FIG. 12 is a block diagram of an exemplary apparatus and/or procedure (e.g., performed by a base station) utilizing certain embodiments of the present disclosure, including those described above with reference to other figures.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 12 shows a block diagram of an exemplary apparatus 1200 utilizing certain embodiments of the present disclosure, including those described above with reference to other figures. In some embodiments, apparatus 1200 comprises a network equipment such as an eNB or component of an eNB. Apparatus 1200 comprises processor 1210 which is operably connected to program memory 1220 and data memory 1230 via bus 1270, which may comprise parallel address and data buses, serial ports, or other methods and/or structures known to those of ordinary skill in the art.

Program memory 1220 comprises software code executed by processor 1210 that enables apparatus 1200 to communicate with one or more other devices using protocols according to various embodiments of the present disclosure, including the Radio Resource Control (RRC) protocol and improvements thereto. Program memory 1220 also comprises software code executed by processor 1210 that facilitates and specifically causes apparatus 1200 to communicate with one or more other devices using other protocols or protocol layers, such as one or more of the PHY, MAC, RLC, PDCP, and RRC layer protocols standardized by 3GPP, or any other higher-layer protocols utilized in conjunction with radio network interface 1240 and core network interface 1250. By way of example and without limitation, core network interface 1250 may comprise the S1 interface and radio network interface 1250 may comprise the Uu interface, as standardized by 3GPP. Program memory 1220 further comprises software code executed by processor 1210 to control the functions of apparatus 1200, including configuring and controlling various components such as radio network interface 1240 and core network interface 1250.

Data memory 1230 may comprise memory area for processor 1210 to store variables used in protocols, configuration, control, and other functions of apparatus 1200. As such, program memory 1220 and data memory 1230 may comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 may comprise multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill in the art will recognize that various protocols and other functions of apparatus 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 may comprise transmitters, receivers, signal processors, ASICs, antennas, beamforming units, and other circuitry that enables apparatus 1200 to communicate with other equipment such as, in some embodiments, a plurality of compatible user equipment (UE). In some exemplary embodiments of the present disclosure, radio network interface may comprise various protocols or protocol layers, such as the LTE PHY, MAC, RLC, PDCP, and RRC layer protocols standardized by 3GPP, improvements thereto such as described herein above, or any other higher-layer protocols utilized in conjunction with radio network interface 1240. According to further exemplary embodiments of the present disclosure, the radio network interface 1240 may comprise a PHY layer based on orthogonal frequency division multiplexing (OFDM) or orthogonal frequency division multiple access (OFDMA) technologies. For example, radio network interface can comprise one or more features described hereinabove with reference to FIGS. 5 and 6, e.g., antenna array features.

Core network interface 1250 can comprise transmitters, receivers, and other circuitry that enables apparatus 1200 to communicate with other equipment in a core network such as, in some embodiments, circuit-switched (CS) and/or packet-switched Core (PS) networks. In some embodiments, core network interface 1250 may comprise the S1 interface standardized by 3GPP. In some exemplary embodiments, core network interface 1250 may comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1250 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1260 may comprise transmitters, receivers, and other circuitry that enables apparatus 1200 to communicate with external networks, computers, databases, and the like for purposes of operations, administration, and maintenance of apparatus 1200 or other network equipment operably connected thereto. Lower layers of OA&M interface 1260 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A radio base station configured to operate a time-division-duplexed (TDD) radio interface utilizing a plurality of time-domain symbols, comprising:
    a medium access control (MAC) processor configured and specifically programmed to schedule transmissions to and from a plurality of devices via a plurality of antennas, wherein the scheduling comprises:
        receiving data for a downlink transmission to a device;
        generating a grant for the device, the grant comprising
            a first resource allocation for the device to receive the data and a second resource allocation for the device to transmit a reception status pertaining to the data; and transmitting the grant and at least one portion of the data in a symbol of the time-domain symbols.

2. The radio base station of claim 1, wherein the MAC processor is configured and specifically programmed to frequency-division multiplex the grant and the at least one portion of the data in the symbol.

3. The radio base station of claim 1, further comprising a plurality of antennas configured to simultaneously transmit or simultaneously receive one or more data streams, each data stream associated with a particular direction, wherein:

the MAC processor is configured and specifically programmed to frequency-division multiplex the grant with at least one other grant to a further device in the symbol; and the plurality of antennas are configured to transmit the symbol spatially multiplexed in at least two streams directed to at least the device and the further device.

4. The radio base station of claim 1, wherein the scheduling of the second resource allocation is based on a data decoding capability of the device.

5. The radio base station of claim 1, wherein the scheduling of the second resource allocation is based on an availability of radio interface resources subsequent to the first resource allocation.

6. The radio base station of claim 1, wherein the MAC processor is further configured and specifically programmed to:

receive a scheduling request (SR) from a further device at fixed semi-static time periods determined that are by the MAC processor;

transmit a further grant to the further device, the further grant comprising a third resource allocation for uplink transmission of second data by the further device; and schedule the second resource allocation based on the third resource allocation.

7. The radio base station of claim 1, wherein the MAC processor is further configured and specifically programmed to receive the reception status from the device and if the reception status comprises negative acknowledgement (NACK):

transmit a further grant to the device, the further grant comprising a third resource allocation for the device to receive the data and a fourth resource allocation for the device to transmit the reception status pertaining to the data; and transmit at least a portion of the data and the further grant in a further symbol.

8. The radio base station of claim 1, wherein the plurality of time-domain symbols are orthogonal frequency division multiplexed (OFDM) symbols.

9. A computer-implemented method for medium access control (MAC) scheduling of transmissions to and from a plurality of devices via a plurality of antennas over a time-division-duplexed (TDD) radio interface utilizing a plurality of time-domain symbols, comprising:

receiving data for a downlink transmission to a device;

generating a grant for the device, the grant comprising a first resource allocation for the device to receive the data and a second resource allocation for the device to transmit a reception status pertaining to the data; and transmitting the grant and at least one portion of the data in a symbol of the time-domain symbols.

10. The computer-implemented method of claim 9, wherein the scheduling of the second resource allocation is based on at least one of a data decoding capability of the device or the availability of radio interface resources subsequent to the first resource allocation.

11. A non-transitory, computer-readable medium comprising computer-executable instructions for medium access control (MAC) scheduling of transmissions to and from a plurality of devices via a plurality of antennas over a time-division-duplexed (TDD) radio interface utilizing a plurality of time-domain symbols, wherein execution of the instructions causes a computer arrangement to:

receive data for a downlink transmission to a device;

generating a grant for the device, the grant comprising a first resource allocation for the device to receive the data and a second resource allocation for the device to transmit a reception status pertaining to the data; and transmit the grant and at least one portion of the data in a symbol of the time-domain symbols.

12. The non-transitory, computer-readable medium of claim 11, wherein the scheduling of the second resource allocation is based on at least one of a data decoding capability of the device or the availability of radio interface resources subsequent to the first resource allocation.

13. The computer-implemented method of claim 9, further comprising frequency-division multiplexing the grant and the at least one portion of the data in the symbol.

14. The computer-implemented method of claim 9, further comprising:

simultaneously transmitting or simultaneously receiving one or more data streams, each data stream associated with a particular direction;

frequency-division multiplexing the grant with at least one other grant to a further device in the symbol; and transmitting the symbol spatially multiplexed in at least two streams directed to at least the device and the further device.

15. The non-transitory, computer-readable medium of claim 11, wherein the computer arrangement is further configured to frequency-division multiplex the grant and the at least one portion of the data in the symbol.

16. The non-transitory, computer-readable medium of claim 11, wherein the computer arrangement is further configured to:

simultaneously transmit or simultaneously receive one or more data streams, each data stream associated with a particular direction;

frequency-division multiplex the grant with at least one other grant to a further device in the symbol; and transmit the symbol spatially multiplexed in at least two streams directed to at least the device and the further device.

* * * * *